(12) United States Patent
Harbol

(10) Patent No.: US 7,258,783 B2
(45) Date of Patent: Aug. 21, 2007

(54) FLUID DELIVERY SYSTEM FOR A WATER TUB USING A REMOVEABLE CHEMICAL CARRIER

(75) Inventor: Keith W. Harbol, Oceanside, CA (US)

(73) Assignee: Watkins Manufacturing Corporation, Vista, CA (US)

( * ) Notice: Subject to any disclaimer, the term of this patent is extended or adjusted under 35 U.S.C. 154(b) by 269 days.

(21) Appl. No.: 10/978,543

(22) Filed: Nov. 1, 2004

(65) Prior Publication Data

US 2006/0090251 A1   May 4, 2006

(51) Int. Cl.
*C02F 1/50* (2006.01)
(52) U.S. Cl. .............................. 210/96.1; 4/488; 4/538; 4/661; 210/136; 210/167.11; 210/198.1; 210/206; 210/416.2; 222/52; 222/132; 222/135
(58) Field of Classification Search ................. 210/206
See application file for complete search history.

(56) References Cited

U.S. PATENT DOCUMENTS

| | | | | |
|---|---|---|---|---|
| 3,746,170 A | * | 7/1973 | Bloom et al. ............. | 210/198.1 |
| 3,917,172 A | * | 11/1975 | O'Hare ..................... | 239/305 |
| 4,016,079 A | * | 4/1977 | Severin .................... | 210/96.1 |
| 4,068,528 A | | 1/1978 | Gundelfinger .......... | 73/422 GC |
| 4,182,184 A | | 1/1980 | Bakalyar et al. ....... | 73/422 GC |
| 4,208,376 A | * | 6/1980 | Sangster et al. ......... | 422/261 |
| 4,224,154 A | * | 9/1980 | Steininger ................ | 210/85 |
| 4,242,909 A | | 1/1981 | Gundelfinger .......... | 73/422 GC |
| 4,506,558 A | | 3/1985 | Bakalyar .................. | 73/863.72 |
| 4,792,396 A | | 12/1988 | Gundelfinger ........... | 210/198.2 |
| 4,859,345 A | * | 8/1989 | Inagaki .................... | 210/764 |
| 5,207,109 A | | 5/1993 | Olsen ....................... | 73/863.73 |
| 5,236,581 A | * | 8/1993 | Perry ........................ | 210/130 |
| 5,803,117 A | | 9/1998 | Olsen et al. ........... | 137/625.15 |
| 6,012,488 A | | 1/2000 | Nichols .................. | 137/625.11 |
| 6,041,971 A | * | 3/2000 | Pineda ..................... | 222/135 |
| 6,125,481 A | * | 10/2000 | Sicilano ..................... | 4/509 |
| 6,155,123 A | | 12/2000 | Bakalyar ................. | 73/864.82 |
| 6,340,431 B2 | * | 1/2002 | Khan ........................ | 210/85 |
| 6,382,035 B1 | | 5/2002 | Nichols ................... | 73/863.72 |
| 6,453,946 B2 | | 9/2002 | Nichols et al. ........ | 137/625.11 |
| 6,672,336 B2 | | 1/2004 | Nichols ................. | 137/625.46 |
| 6,982,040 B2 | * | 1/2006 | Costa et al. ............. | 210/753 |
| 7,060,190 B2 | * | 6/2006 | King et al. ............... | 210/754 |

* cited by examiner

*Primary Examiner*—Peter A. Hruskoci

(57) ABSTRACT

A water tub including a fluid delivery system utilizes a removeable carrier to provide fluids to the fluid delivery system. In some instances, the carrier is disposable such that depletion of the fluids within the container results in the carrier being thrown away and replaced by an unused carrier. In other instances, the carrier is re-usable and is removed from the fluid delivery system when the fluids within the carrier need to be replenished. In some instances, the carrier can be manually attached and removed from the fluid delivery system without the use of any tools. In some such instances it will include a latching mechanism temporarily coupling the carrier to the fluid delivery system. The carrier may include a plurality of fluid containers, each container containing a fluid used for different types of maintenance of the water tub. The delivery system may utilize a dosing engine.

20 Claims, 4 Drawing Sheets

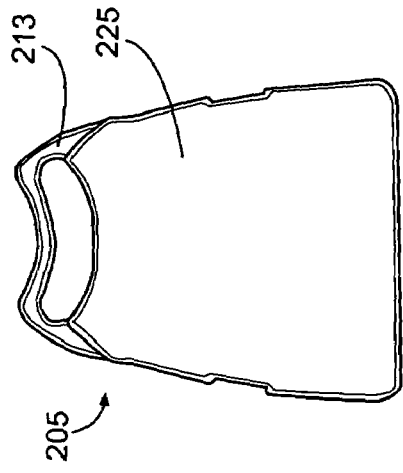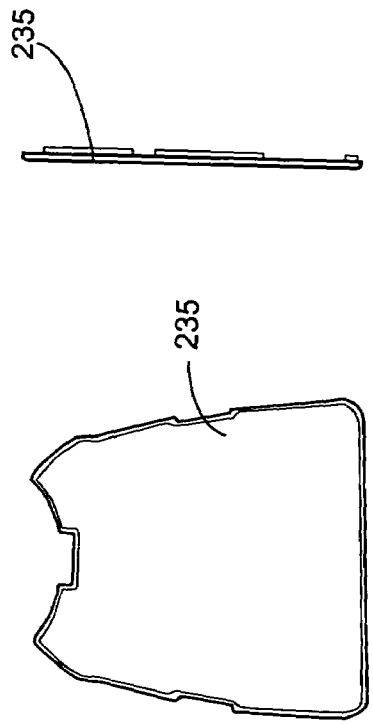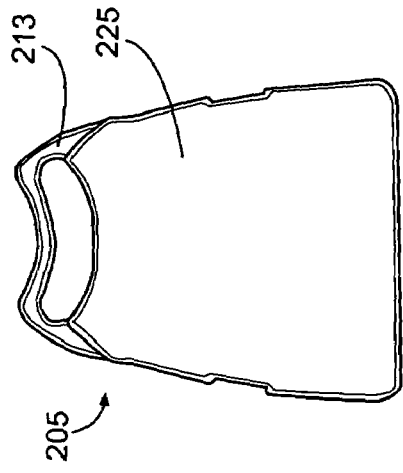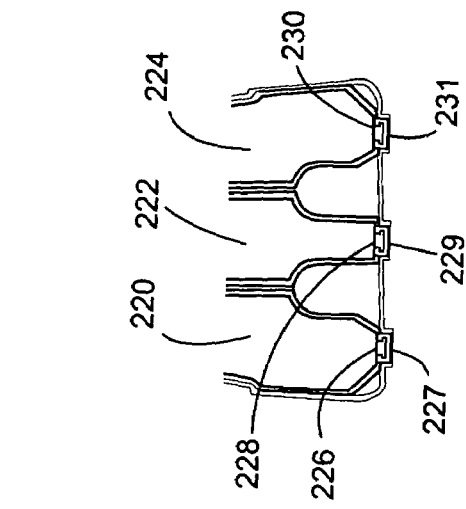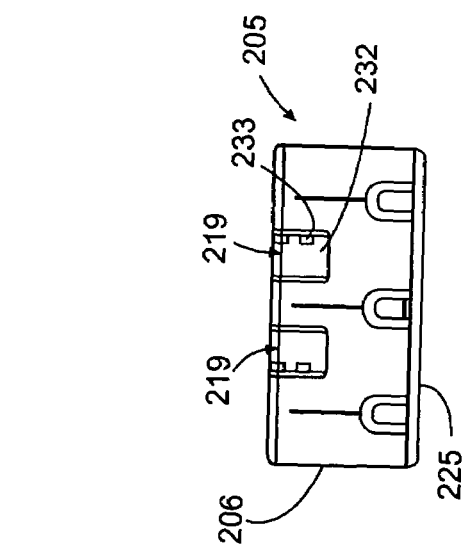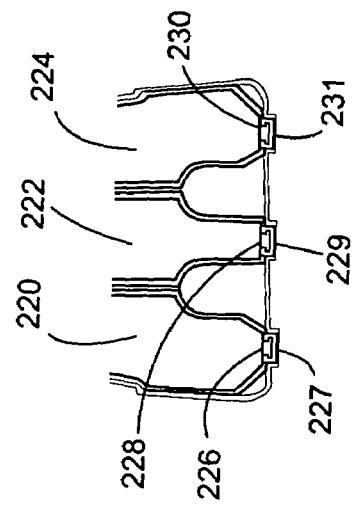

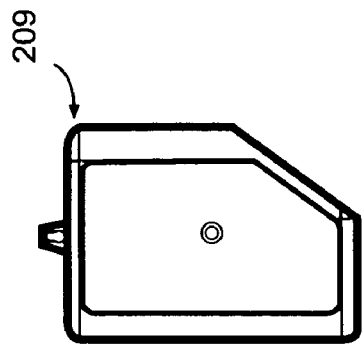
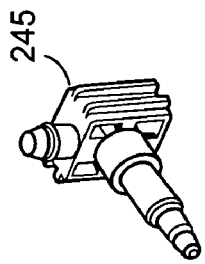
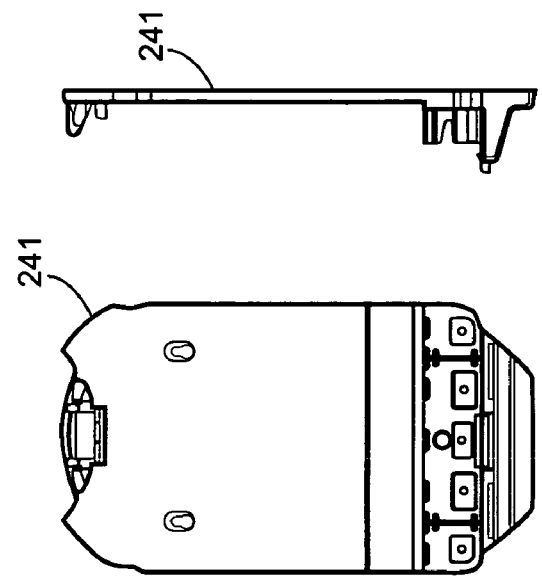
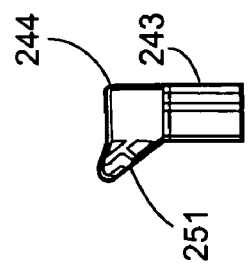
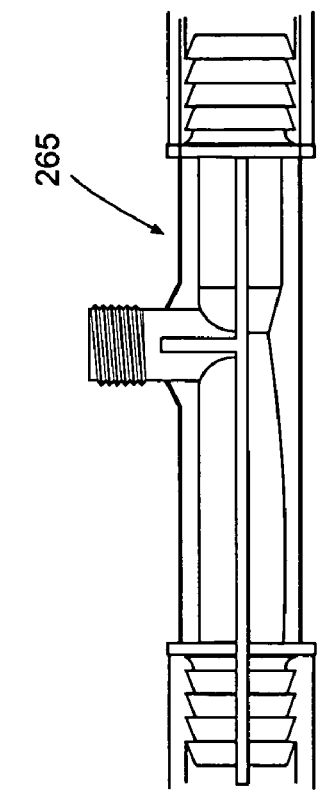
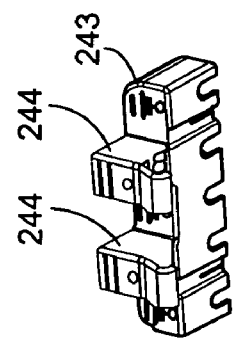

FLUID DELIVERY SYSTEM FOR A WATER TUB USING A REMOVEABLE CHEMICAL CARRIER

FIELD OF THE INVENTION

The present invention relates generally to water treatment systems, and more particularly to water treatment for water tubs used by people for soaking and/or bathing such as spas, hot tubs, and whirlpool baths.

BACKGROUND OF THE INVENTION

Water tubs are frequently used for recreational and/or therapeutic purposes. However, repeated and/or long term use tends to have a negative impact on water quality when water within such tubs is not replaced. As replacement of water in a water tub between uses is generally not convenient or cost effective, it is desirable to provide means for maintaining and/or improving water quality. Moreover, the benefits provided by a water tub are often enhanced by directing one or more streams/jets of water into the tub. As such, water tubs are frequently coupled to water circulation and/or filtration system.

As used herein, a water tub is any apparatus comprising a cavity sized and dimensioned to permit a person to submerge all or at least part of his/her body within water held in a cavity of the water tub. As such, a water tubs may be a spa, hot tub, or whirlpool bath. Such a water tub frequently has one or more support systems such as water circulation and/or filtering systems to maintain water temperature and/or quality. In many instances, such a tub will also include one or more outlets used to direct a stream/jet of water into the cavity in a direction likely to impact a person seated or standing within the cavity, or having a limb positioned within the cavity, particularly if the cavity contains the number of people it is adapted to hold. In some instances the cavity may be sized and dimensioned to allow one or more people to sit within the cavity and be submerged to chest or shoulder height. In other instances, the cavity may be sized and dimensioned to only permit a limb of a person to be submerged such as with a whirlpool bath sized for soaking a person's foot, ankle, and calf. As used herein, water tubs generally do not include tanks or other containers that are not adapted for human use in that they are not easily entered and exited by a person or animal, are overly large or to small for bathing and/or soaking, and/or comprise systems for creating or maintaining conditions not suitable for bathing and/or soaking such as extreme temperatures or maintaining a cavity filled with chemicals not suitable for a person or animal to bathe or soak in. Examples of various water tubs, water tub support systems, and related methods can be found by referring to U.S. Patents referencing one or more of classes U.S. Pat. Nos. D23/277, 4/488, 4/538, and/or any related subclasses. It should be noted that such patents are not necessarily all prior art, and referencing them herein is not an assertion or admission that they are prior art.

Although prior water tubs are known, there is a need for novel water tubs at least in part because previously known water tubs, support systems, and related methods do not provide a balance between features such as reduced cost and increased maintainability, operability, and portability that is suitable in all instances.

SUMMARY OF THE INVENTION

The present invention is directed to a water tub including a fluid delivery system that uses a removeably fluid container. The fluid container includes a plurality of fluids, and is structured such that: (a) the carrier can be removeably coupled to a fluid delivery system such that, while the carrier is coupled to the fluid delivery system, the fluid delivery system can obtain at least portions of the plurality of fluids from the carrier; (b) the carrier can be separated from the fluid delivery system; and (c) the plurality of fluids can be replenished while the carrier is separated from the fluid delivery system. The carrier includes a plurality of cavities, each cavity comprising a fluid container, each container comprising one of the plurality of fluids.

BRIEF DESCRIPTION OF THE DRAWINGS

The exact nature of this invention, as well as the objects and advantages thereof, will become readily apparent from consideration of the following specification in conjunction with the accompanying drawings in which like reference numerals designate like parts throughout the figures thereof and wherein:

FIG. 6 is a front view of a cover for the carrier of FIG. 3.

FIG. 7 is a side view of the cover of FIG. 6.

FIG. 8 is a front view of the carrier of FIG. 3.

FIG. 9 is a side view of the carrier of FIG. 3.

FIG. 10 is a bottom view of the carrier of FIG. 3.

FIG. 11 is a partial view of a carrier including fluid containers in the cavities.

FIG. 12 is a front view of a base of the delivery system of FIG. 3.

FIG. 13 is a side view of a base of FIG. 14.

FIG. 14 is a perspective view of a manifold of the delivery system of FIG. 3.

FIG. 15 is a side view of the manifold of FIG. 16.

FIG. 16 is a perspective view of a connector of the delivery system of FIG. 3.

FIG. 17 is a front view of a dosing engine of the delivery system of FIG. 3.

FIG. 18 is a side view of a portion of a delivery apparatus of the system of FIG. 3.

DETAILED DESCRIPTION OF THE PREFERRED EMBODIMENTS

Reference will now be made to the preferred embodiments of the invention, examples of which are illustrated in the accompanying drawings. While the invention will be described in conjunction with the preferred embodiments, it will be understood that these embodiments are not intended to limit the invention. On the contrary, the invention is intended to cover alternatives, modifications and equivalents, which may be included within the spirit and scope of the invention as defined by the appended claims. In the following detailed description, numerous specific details are set forth in order to provide a thorough understanding of the present invention. However, it will be understood by one of ordinary skill in the art that the present invention may be practiced without these specific details. In other instances, well known methods, procedures, components, and circuits have not been described in detail so as not to unnecessarily obscure the important aspects of the present invention.

Figure 2:
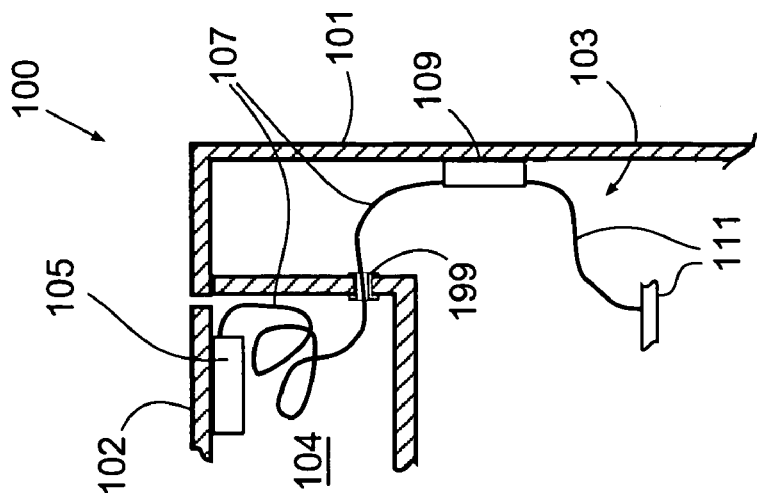
FIG. 2 is a cutaway side view of the water tub of FIG. 1.
Figure 1:
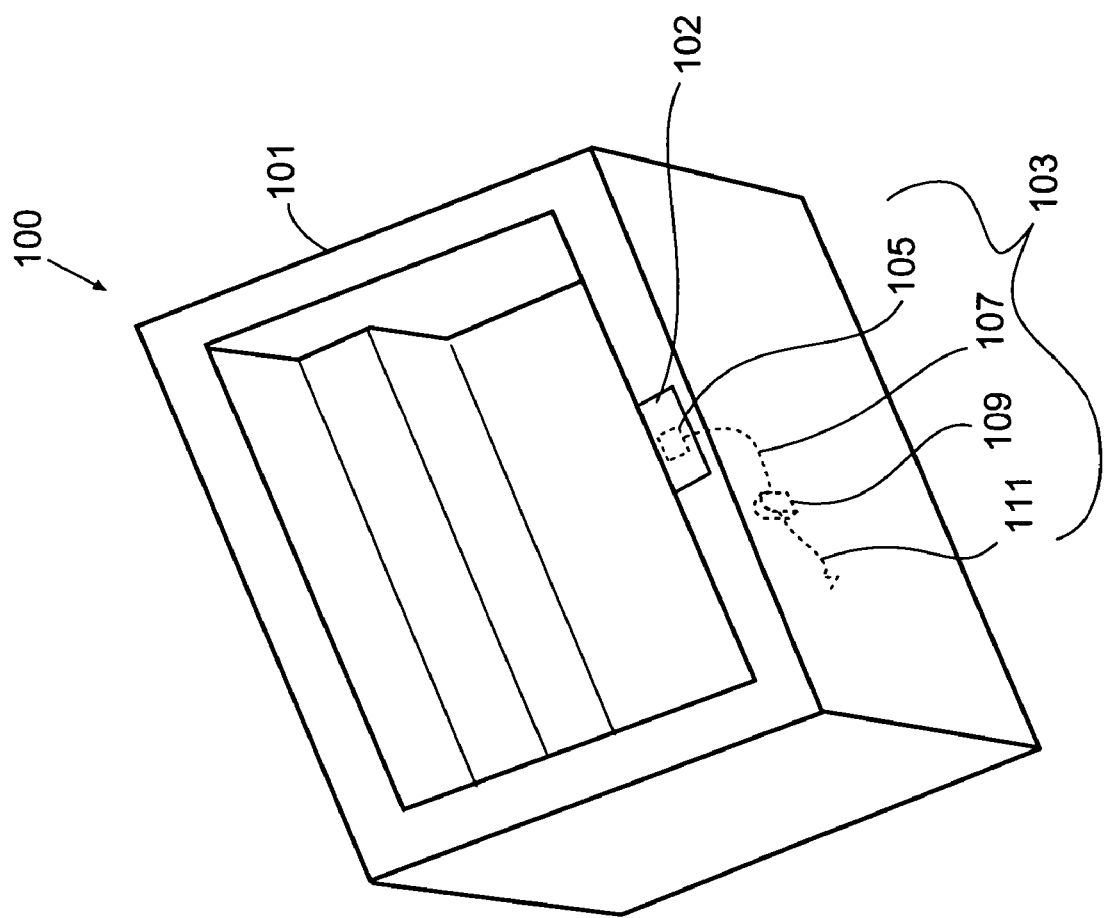
FIG. 1 is water tub in accordance with an exemplary embodiment of the invention.
Figure 4:
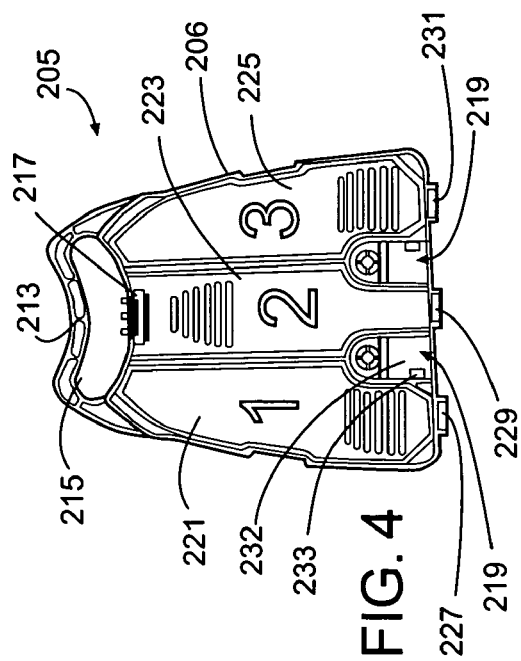
FIG. 4 is a front view of the body of the carrier of FIG. 3.
Figure 5:
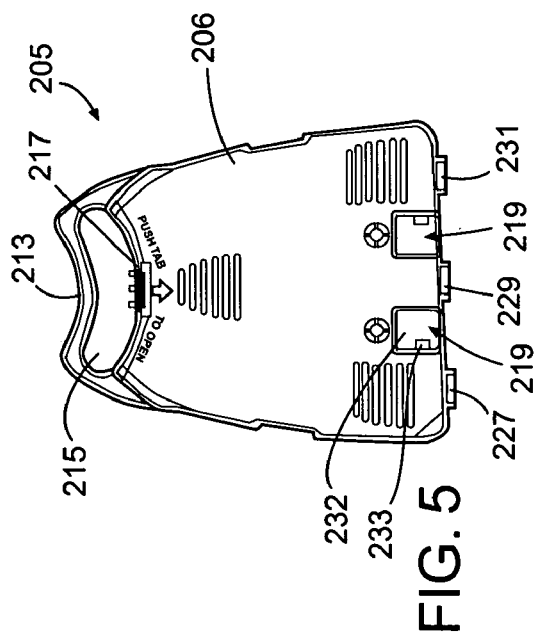
FIG. 5 is a back view of the body of FIG. 4.

In FIGS. 1 and 2, a water tub 100 includes a delivery system 103 for introducing fluids and/or fluid like substances into water circulating through tub 100. The system 103 may be suitable for delivering any fluid and/or fluid like substances or any combination of fluids and/or fluid like substances (hereinafter "fluids" or "chemicals"). The delivery system 103 includes a removeable carrier 105, a transfer apparatus 107, a dosing engine 109, and a delivery apparatus 111. The delivery system 103 operates by using the dosing engine 109 to obtain chemicals from the carrier 105 via the transfer apparatus 107, and to introduce measured quantities of such chemicals into the water tub 100 via the delivery apparatus 111. The dosing engine 109 may, in some instances, need to be coupled to a vacuum source, a source of pressurized air or other gas, and/or a source of electricity to permit the dosing engine 109 to function properly.

The removeable carrier 105 is used to provide a source of fluids to the dosing engine 109. When the fluids within the carrier 105 are at least partially consumed, the carrier 105 will need to be either replaced or refilled. If replaced, the old carrier can be disposed of while a new, unused carrier is used to replace it. In other instances, the carrier 105 may be re-useable in that it can be removed and have the fluids it contains replenished prior re-coupling it to the delivery system 103.

It is contemplated that placing the removeable carrier 105 in a filter compartment 104 (i.e. a compartment containing at least partially submerged filters through which water flows when circulating in tub 100) of the tub 100 may be advantageous as such a compartment is typically covered, but is accessible by removing the cover 102. As such, removing the cover 102 of the filter compartment would facilitate replacement of any filters used by the water tub 100, and would also facilitate removing and/or replacing the removeable carrier 105. As the carrier 105 contains only a limited amount of fluids, and as such fluids will be depleted over time as they are delivered to water contained in the tub 100, the carrier 105 will typically have to have such fluids replenished periodically.

It is contemplated that mounting the carrier 105 to the lid/cover 102 will facilitate replacing the carrier 105 and will also position the carrier 105 so it is typically not fully, and possibly not even partially, submerged in the water within the filter compartment 104. If there is sufficient excess tubing of transfer apparatus 107 in the compartment 104, the lid 102 can be swung open and/or removed while the carrier 105 is still coupled to it. Being able to remove the carrier with the lid provides convenient access to the carrier 105, while the lid provides a good base to which the portion of the transfer apparatus 107 couples to the carrier 105 can be mounted.

It is advantageous to have the carrier 105 be manually removeable from the delivery system 103 in that removal can be accomplished by hand, preferably without the use of any tools. It is also advantageous to have the carrier 105 sized such that, when full, it can be carried by a person using only one hand to grasp the carrier 105. It is contemplated that in some instances, the carrier 105 will be sized such that its weight when full is less than 60 lbs. It is actually preferable that it weigh less than 40 lbs, and in some instances less than 20 lbs or less than 10 lbs. In some instances it is most preferable that it weigh less than 5 lbs. Although smaller carriers may be depleted more rapidly, the reduced weight and size facilitates buying a plurality of containers at one. In some instances, a preferred carrier may be less than 8 inches high, 8 inches wide, and 4 inches deep.

As the filter compartment is one containing a portion of the water in the tub 100, it is contemplated that the transfer mechanism 107 will include apparatus 199 for preventing water from leaking out of the filter compartment. It is contemplated that the dosing engine 109 may be positioned in an equipment compartment with the pumps, heater, and/or other equipment incorporated into the tub 100.

The fluids delivered by the system 103 may comprise any substance or combination of substances that can be contained in the carrier 105, transferred to the dosing engine 109, and introduced into the water of the water tub 100 via the delivery apparatus 111. As such, the fluids referred to herein may include, but are not necessarily limited to USEPA sanitizers, oxidizers, water balance chemicals (i.e. pH Increaser/Decreaser, Total Alkalinity Increaser/Decreaser, Total Hardness Increaser, etc.), waterline control, chemical indicators, defoamers, flocculants, fragrances, and any other liquid chemical for recreational water use.

Figure 3:
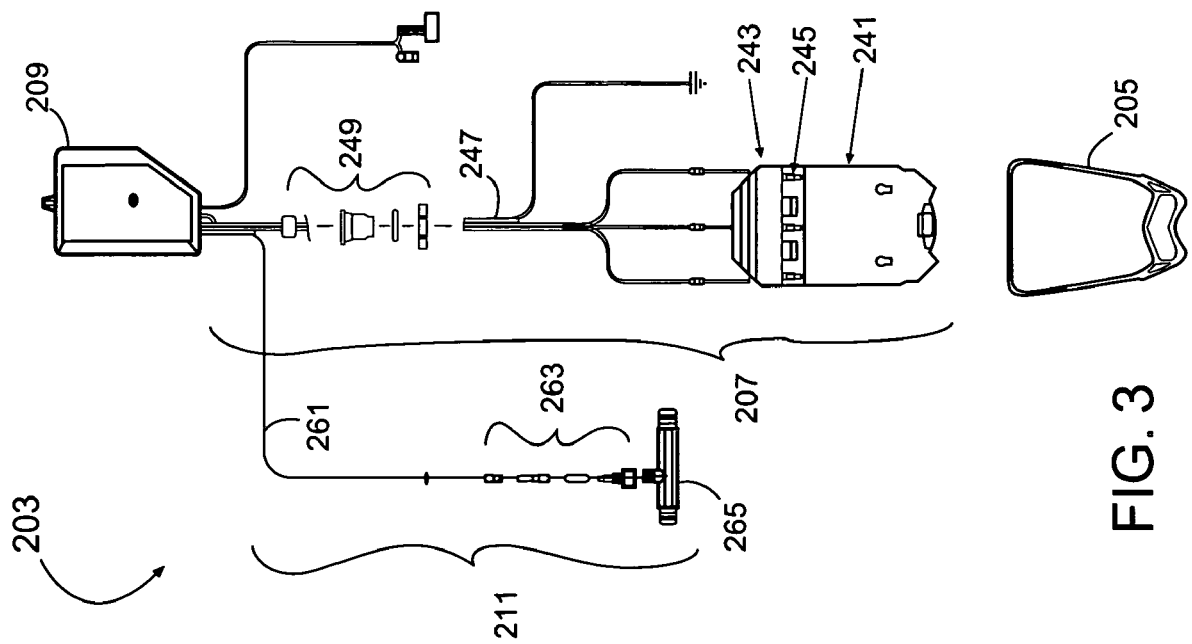
FIG. 3 is a schematic view of a delivery system including a removeable carrier in accordance with an exemplary embodiment of the invention.

In some instances, delivery system 103 may be capable of introducing a plurality of chemicals into water tub 100. Delivery system 203 of FIG. 3 is such an instance of the delivery system 103. In FIG. 3, a delivery system 203 includes a carrier 205, a transfer apparatus 207, a dosing engine 209, and a delivery apparatus 211.

As shown in FIGS. 4-10, the carrier 205 includes a body 206, a cover 235, and a carrier latching mechanism 217. The body 206 includes, a handle 213, a finger receiving portion 215, manifold engaging members 219, a first chemical retention cavity 221, a second chemical retention cavity 223, a third chemical retention cavity 225, a first cavity connector 227, a second cavity connector 229, and a third cavity connector 231. As shown, handle 213 encircles finger receiving portion 215, with the handle 213 and finger receiving portion 215 being sized and dimensioned to allow a person to grasp and carry carrier 205 via handle 213 in one hand while the fingers of that hand are wrapped around handle 213 and extend through finger receiving portion 215.

Manifold engaging members 219 include recesses 232 and protrusions 233 with recesses 232 being sized and positioned to receive retention arms 244 of manifold 243 of transfer apparatus 207. Retention arms 244 include channels 251 shaped such that protrusions 233 are moved along channels 251 by rotating carrier 205 relative to arms 244 and manifold 243. When the protrusions 233 are at or near the closed ends of the channels 251, the carrier 205 is substantially parallel to, and is latched to, the base 241. Carrier 205 latches to the base 241 or some other portion of the transfer apparatus 207 via latching mechanism 217. The latching mechanism 217 is a flexible tab interacting with the base 241 that can be manipulated, i.e. moved relative to the base 241 or some other portion of the transfer apparatus 207, by pushing the tab while grasping the handle. The latching mechanism 217 permits the carrier 205 to be attached and detached from the delivery system 203 simply be pushing on the flexible tab and rotating the carrier 205 relative to the base 241. It is contemplated that alternative embodiment may utilize alternative latching mechanisms.

The chemical retention cavities 221, 223, and 225 are used to store chemicals to be delivered by delivery system 203. The cavity connectors 227, 229, and 231 provide means for the transfer apparatus 207 to extract such chemicals from the chemical cavities 221, 223, and 225. The connectors 227, 229, and 231 may, in some instances, also be used to initially fill the cavities. The connectors 223, 229 and 231 are preferably sealed such that chemicals within the cavities 221, 223, and 225 will not leak out through the connectors unless the carrier is coupled to the transfer apparatus 207. In some instances the connectors are sealed only prior to initial use while in others they are sealed in such a manner that removal of the carrier 205 from the transfer apparatus 207 causes the cavities to be resealed.

In some instances, the cavities 221, 223, and 225 may each contain a fluid container 220, 222, and 224, containing one of the fluids to be delivered by the delivery system 203. Referring to FIG. 11, in such an instance the cavity connectors 227, 229, and 231 may simply be orifices providing access to the orifices 226, 228, and 230 of containers 220, 222, and 224. In such an instance, the orifices 226, 228 and 230 may each be part of a check valve, sealable nipple, or similar apparatus that is open when a portion of connector 245 is pushed through a cavity orifice and the corresponding fluid container orifice/check valve ((226, 227), (228, 229), (230, 231)). In other instances, the orifices 226, 228, and 230 may simply be sealed in a manner that inserting connectors 245 breaks the seal.

When the cavities contain fluid containers, the orifice of each cavity is aligned with the orifice of the fluid container of the cavity such that a male connector (i.e. connector 245) pushed through the orifice of a cavity will likely pass through the orifice of the fluid container within the cavity if the male connector is long enough to extend between the orifices. In some instances, the orifice/valve of the fluid container may be clipped or otherwise fastened to the carrier 205 adjacent to the corresponding cavity orifice.

The carrier 205 is structured such that the carrier 205 can be removeably coupled to the delivery system 203, i.e. it can be coupled to the delivery system when it has fluids/chemicals for the delivery system to deliver, and can be removed when the fluids of the carrier 205 need to be replenished. As such, while the carrier 205 is coupled to the delivery system 203, the delivery system 203 can obtain at least portions of a plurality of fluids from the carrier 205. Moreover, when the fluids need to be replenished, the carrier 205 can be separated from the delivery system 203 and replaced. Alternatively, the plurality of fluids can be replenished while the carrier 205 is separated from the delivery system 203. The carrier 205 is structured to be removeably coupled to system 203 at least in part because it includes the plurality of cavities, 221, 223, and 225, and in some instances, includes a fluid container 220, 222, or 224 in each cavity with each container comprising one of the plurality of fluids. In the embodiment shown, it is also structured to be removeably coupled because it includes the latching mechanism 217.

When the cavities 221, 223, and 225 are used to contain the fluid containers 220, 222, and 224, when the cover 235 is removed from the body there is sufficient access to each of the cavities such that a fluid container can be positioned within the cavity. When the cover 235 is coupled to the body, the cover 235 inhibits removal of the fluid containers from the carrier. In some instances, the cover 235 will fully enclose the cavities 221, 223, and 225. As used herein, a cavity is fully enclosed if the only way in which a rod having a diameter of at least 2 mm can be extended from outside the cavity into the cavity is to cause it to pass through the cavity orifice (227, 229, or 231).

The body 206 and cover 235 are preferably formed from molded plastic, and to each comprise a single piece of plastic. However, alternative embodiment may utilize a different material or combination of materials, and/or may comprise a body and/or cover that is an assembly of a plurality of pieces. If the carrier 205 is intended to be thrown away after use, the cover 235 is preferably non-removeably coupled to the body 206, i.e. is coupled the body such that removal will likely damage the body 206 and/or the cover 235. In some instances, non-removeably coupling the cover 235 to the body 206 will comprise using an adhesive to bond the cover 235 to the body 206. For a non-disposable carrier, i.e. one that is intended to be refilled for re-use, the cover 235 may be removeably fastened to the body using screws or some other fastening mechanism.

The fluid containers 220, 222, and 224 may, in some instances, be shaped to fit a particular cavity of the cavities 221, 223, and 225. In other instances, they may each have a more generic shape, and be shaped to conform to the shape of a cavity by inserting a partially filled container into the cavity to force it to a particular shape, or filling a container while it is within a cavity such that it conforms to the shape of the cavity as it is filled. The fluid containers are preferably a plastic that is does not interact with any chemicals contained in the container, but other embodiments may utilize other materials or combinations of materials.

As shown in FIGS. 3 and 17-18, dosing engine 209 is a dispensing device comprising a switching valve assembly, pump assembly, circuit board, and enclosure. The purpose of this product is to aspirate chemicals and dispense them into a water tub. The delivery apparatus operates automatically using firmware that is downloaded onto the on-board microcontroller. The microcontroller commands the motor of the switching valve to the desired position and then the motor of the pump assembly is commanded to aspirate or dispense fluid chemical. Delivery apparatus 211 comprises tube 261, coupling assembly 263, and injector 265. Injector 265 is situated such that chemicals transferred from dosing engine 209 via tube 261 and coupling assembly 263 will be introduced into water circulating through tub 100. The type of dosing engine used will likely vary between embodiments.

The delivery system 203 operates by using the dosing engine 209 to obtain chemicals from the carrier 205 via the transfer apparatus 207, and to introduce measured quantities of such chemicals into the water tub 201 via the delivery apparatus 211. The dosing engine 209 may, in some instances, need to be coupled to a vacuum source, a source of pressurized air or other gas, and/or a source of electricity to permit the dosing engine 209 to function properly.

The delivery apparatus 211 creates a vacuum by the flow of continuous water through the delivery device 265. Once the chemical is obtained from the chemical carrier 205 via the apparatus 207, the dosing engine can then aspirate the chemical via the delivery apparatus 211.

Referring back to FIG. 3, as well as to FIGS. 14-18, transfer apparatus 207 comprises a base 241, a manifold 243, connectors 245, tubes 247, and feed-through device 249. The base 241, manifold 243, and connectors 245 cooperate to receive carrier 205 such that tubes 247 are in fluid connection with cavities 221, 223, and 225 and can transport chemicals flowing from the cavities 221, 223, and 225 to dosing engine 209.

The function of the delivery apparatus 211 and the transfer apparatus 207 is primarily to move fluids. As such, they will typically comprise a plurality of tubes, connectors, manifolds, and similar devices made from a variety of materials or combinations of materials. The delivery apparatus 211 and/or the transfer apparatus 207 may have any form in a particular embodiment so long as it is able to transfer fluids in the manner described herein.

In some instances the dosing engine 209 may comprise a user interface that can be used to place the dosing engine into one of at least three states by interacting with the user interface. In some instances, states may include a start-up state, a maintenance state, and a sensoring state. In some instances, the dosing engine will have a flow path extending between the removable carrier 205 and the dosing 209 that is dedicated to each state. In such instances, each cavity 221, 223, and 225 of the carrier 205 may also be dedicated to a particular operating state, and include a fluid appropriate for use in such an operating state. Dedicating a carrier cavity may, in some instances, be accomplished by coupling a dedicated flow path to a connector providing access to the cavity.

In some instances, subsequent to a change in state from a prior state to a current state, the dosing engine may pump out and measure one or more quantities of fluids/chemicals contained in any cavities of the fluid carrier associated with the current state, and may introduce any such pumped and measured quantities into the water retention cavity or the water flow path of the water tub via at least one of the one or more delivery flow paths.

It is contemplated that in some instances the dosing engine may be adapted to measure a characteristic related to water quality, and to deliver chemicals based at least in part on the measured characteristic. In some such instances, the dosing engine may also be adapted to introduce a chemical from the fluid carrier prior to measuring the characteristic related to water quality wherein the introduced chemical facilitates measuring the characteristic.

It is contemplated that the apparatus and methods disclosed herein may be used in combination with one or more features of previously or subsequently known water tubs, water tub support systems, and/or related methods.

It is also contemplated that combinations incorporating one or more features described in patents and/or patent applications assigned to Watkins Manufacturing Corporation, each of which is herein incorporated by reference in its entirety, may prove particularly advantageous. Such incorporated patents and/or patent applications include, but are not necessarily limited to, the following U.S. Patents: U.S. Pat. No. D492,936 titled "Spa control panel"; U.S. Pat. No. 6,692,683 titled "Method of making an extruded multilayer polymeric shell having textured and marbled surface"; U.S. Pat. No. 6,556,684 titled "Spa audio system"; U.S. Pat. No. 6,551,263 titled "Massage generator for a spa; U.S. Pat. No. 6,516,070 titled "Spa audio system operable with a remote control"; U.S. Pat. No. D465,576 titled "Portable spa"; U.S. Pat. No. 7 6,470,508 titled "Air check valve system for a spa; U.S. Pat. No. D463,569 titled "Portable spa"; U.S. Pat. No. D463,028 titled "Portable spa"; U.S. Pat. No. 6,435,691 titled "Lighting apparatus for portable spas and the like"; U.S. Pat. No. 6,349,427 titled "Portable spa construction"; U.S. Pat. No. 6,324,707 titled "Personal Spa"; U.S. Pat. No. D449,281 titled "Wireless controller"; U.S. Pat. No. D446,862 titled "Spa shell"; U.S. Pat. No. D446,310 titled "Spa shell"; U.S. Pat. No. D446,309 titled "Spa shell"; U.S. Pat. No. D445,904 titled "Spa shell:; U.S. Pat. No. 6,231,938 titled "Extruded multilayer polymeric shell having textured and marbled surface"; U.S. Pat. No. 6,195,811 titled "Spa cover mounting method and apparatus"; U.S. Pat. No. D436,178 titled "Spa shell"; U.S. Pat. No. D431,297 titled "Spa shell"; U.S. Pat. No. 5,943,711 titled "Gatling jet"; U.S. Pat. No. 5,928,171 titled "Neck jet pillow for tub spas"; U.S. Pat. No. 5,924,850 titled "Pump shroud apparatus for cooling portable spa equipment compartments"; U.S. Pat. No. D407,805 titled "Spa face plate"; U.S. Pat. No. 5,872,890 titled "Cartridge heater system"; U.S. Pat. No. D405,533 titled "Spa face plate"; U.S. Pat. No. D405,186 titled "Spa shell"; U.S. Pat. No. D405,185 titled "Spa shell"; U.S. Pat. No. D405,184 titled "Spa face plate"; U.S. Pat. No. D405,183 titled "Spa face plate"; U.S. Pat. No. D405,182 titled "Spa shell"; U.S. Pat. No. D405,181 titled "Spa shell"; U.S. Pat. No. 5,810,262 titled "Spa jet with interchangeable nozzles; U.S. Pat. No. 5,810,257 titled "Rotary spa jet"; U.S. Pat. No. 5,742,953 titled "Gatling jet"; U.S. Pat. No. 5,716,333 titled "Neck jet pillow"; U.S. Pat. No. D387,870 titled "Spa shell"; U.S. Pat. No. D387,869 titled "Spa shell"; U.S. Pat. No. 5,685,032 titled "Portable spa with integral bottom pan, interchangeable side skirt, and interlocking cover"; U.S. Pat. No. 5,685,031 titled "Three-piece portable spa cover"; U.S. Pat. No. 5,647,736 titled "Pump shroud apparatus for portable spas"; U.S. Pat. No. 5,628,073 titled "Sauna"; U.S. Pat. No. 5,615,421 titled "Portable spa with integral bottom pan, interchangeable side skirt, and interlocking cover"; U.S. Pat. No. 5,564,137 titled "Portable spa with integral bottom pan, interchangeable side skirt, and interlocking cover"; U.S. Pat. No. 5,514,315 titled "Polypropylene spa shell manufacturing method"; U.S. Pat. No. D368,530 titled "Spa shell"; U.S. Pat. No. D367,710 titled "Spa cover"; U.S. Pat. No. D367,709 titled "Combined spa and cover"; and U.S. Pat. No. D367,708 titled "Spa shell".

The embodiments of the present invention described herein comprise multiple novel features with each described embodiment including either a single such feature or a combination of such features. Other contemplated embodiments include all combinations of one or more such novel features not explicitly described herein as such combinations are readily discernable from the embodiments described.

What is claimed is:

1. A water treatment apparatus for a water tub having a circulation system, the apparatus comprising:
    an enclosed carrier holding a plurality of individually sealed fluid containers, the carrier being removably mounted in the water tub circulation system to deliver fluid from the plurality of sealed fluid containers to the water tub upon being coupled to the circulation system.

2. The apparatus of claim 1 wherein the carrier comprises:
    a body including a plurality of cavities, each cavity containing a fluid container; and
    a cover removably coupled to the body enclosing the plurality of fluid containers within the body cavities.

3. The apparatus of claim 1 wherein the carrier comprises:
    a body including a plurality of cavities, each cavity containing a fluid container; and
    a cover sealed to the body enclosing the plurality of fluid containers within the body cavities.

4. The apparatus of claim 3 wherein the cover is adhesively fastened to the body.

5. The apparatus of claim 4 wherein the carrier further comprises:
    a first plurality of orifices one for each cavity in the body, each orifice providing a fluid flow path;
    a second plurality of orifices one for each fluid container, each orifice providing a fluid flow path.

6. The apparatus of claim 5 wherein each fluid container orifice comprises a check valve that includes an orifice.

7. The apparatus of claim 5 wherein the only flow path extending between an outer surface of the container and any of the plurality of cavities are the orifices.

8. The apparatus of claim 1 wherein the plurality of fluid containers hold one or more of the following fluids: USEPA sanitizers, oxidizers, pH modifiers, alkalinity modifiers, hardness modifiers, chemical indicators, defoamers, flocculants, and fragrances.

9. A water treatment apparatus for a water tub having a circulation system, the treatment apparatus having a plurality of fluid containers, each container holding a fluid for treating the water in the tub, the apparatus comprising:
a dosing engine;
a carrier holding the plurality of fluid containers, the carrier being removably coupled to the dosing engine;
a transfer apparatus including one or more fluid transfer flow paths between the carrier and the dosing engine; and
a delivery apparatus including one or more fluid delivery flow paths between the dosing engine and the circulation system of the water tub.

10. The apparatus of claim 9 wherein each of the plurality of containers is coupled to the dosing engine via one or more of the transfer flow paths of the transfer apparatus.

11. The apparatus of claim 10 wherein the plurality of fluids comprise at least three different fluids.

12. The apparatus of claim 11 wherein the water tub includes a filter compartment having at least one flow-through water filter coupled to the circulation system of the water tub, the carrier being located within the filter compartment.

13. The apparatus of claim 12 wherein the transfer apparatus further comprises a plurality of male connectors wherein:
each male connector is sized and positioned to be paired with, and at least partially fit within, a corresponding orifice of a fluid container in the carrier, and
each male connector defines a part of a transfer flow path extending between a fluid container and the dosing engine.

14. The apparatus of claim 13 wherein the carrier comprises a manual latching mechanism inhibiting removal of the carrier from the filter compartment.

15. The apparatus of claim 14 wherein the carrier is latched to a base adhesively fastened to a lid of the filter compartment.

16. The apparatus of claim 9 wherein the dosing engine can be placed in a start-up state, a maintenance state, and a sensing state.

17. The apparatus of claim 16 wherein, subsequent to a change in state the dosing engine pumps out and measures a quantity of any chemicals contained in any of the fluid carriers coupled to any of the transfer flow paths and introduces any such pumped and measured quantities into the water tub via at least one of the one or more fluid delivery flow paths.

18. The apparatus of claim 17 wherein the carrier has a single container associated with each dosing engine state and a separate flow path extending between a single container and the dosing engine.

19. The apparatus of claim 9 wherein the dosing engine is adapted to measure a characteristic related to water quality, and to deliver chemicals based at least in part on the measured characteristic.

20. The apparatus of claim 19 wherein the dosing engine is adapted to deliver a chemical from the carrier prior to measuring the characteristic related to water quality, wherein the introduced chemical facilitates measuring the characteristic.

* * * * *